United States Patent
Magnaghi et al.

(10) Patent No.: US 10,585,952 B2
(45) Date of Patent: *Mar. 10, 2020

(54) SYSTEMS AND METHODS FOR DETERMINING CONTENT POPULARITY BASED ON SEARCHES

(71) Applicant: Leaf Group Ltd., Santa Monica, CA (US)

(72) Inventors: Antonio Magnaghi, Los Angeles, CA (US); Jeremy Daw, San Francisco, CA (US)

(73) Assignee: Leaf Group Ltd., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,362

(22) Filed: Apr. 14, 2017

(65) Prior Publication Data
US 2017/0220609 A1    Aug. 3, 2017

Related U.S. Application Data

(63) Continuation of application No. 13/869,758, filed on Apr. 24, 2013, now Pat. No. 9,626,438.

(51) Int. Cl.
*G06F 17/30* (2006.01)
*G06F 16/951* (2019.01)
(Continued)

(52) U.S. Cl.
CPC ............ *G06F 16/951* (2019.01); *G06F 16/00* (2019.01); *G06F 16/215* (2019.01);
(Continued)

(58) Field of Classification Search
CPC ............. G06F 17/30303; G06F 16/951; G06F 16/215; G06F 16/2365; G06F 16/24578
See application file for complete search history.

(56) References Cited

U.S. PATENT DOCUMENTS 5,974,412 A    10/1999  Hazlehurst et al.
6,199,061 B1    3/2001  Blewett et al.
(Continued)

FOREIGN PATENT DOCUMENTS

JP    2010140154    6/2010
KR    1020070095506    10/2007
(Continued)

OTHER PUBLICATIONS

Yoon, Ju-Hyoung et al. "An Object Model of Korean Web Pages for Title Identification", 15th Annual Conference on Human and Cognitive Language Technology, 2003, 5 pages.
(Continued)

*Primary Examiner* — Syed H Hasan
(74) *Attorney, Agent, or Firm* — Greenberg Traurig (57) ABSTRACT

Embodiments of the present disclosure help content providers identify popular topics based on Internet search data, as well as to quantify the popularity of content addressing those topics. A computer-implemented method according to one embodiment of the present disclosure comprises receiving search data by a computer system; identifying a category related to at least a portion of the search data; determining, by the computer system and based on the search data, a topic for content associated with the identified category; and determining, by the computer system, a score indicative of a level of popularity for the topic, wherein determining the score is based on the search data and on one or more formats for the content associated with the topic.

20 Claims, 2 Drawing Sheets

(51) Int. Cl.
*G06Q 30/02* (2012.01)
*G06F 16/215* (2019.01)
*G06F 16/23* (2019.01)
*G06F 16/2457* (2019.01)
*G06F 16/00* (2019.01)

(52) U.S. Cl.
CPC .... *G06F 16/2365* (2019.01); *G06F 16/24578* (2019.01); *G06Q 30/0202* (2013.01)

(56) References Cited

U.S. PATENT DOCUMENTS

| | | |
|---|---|---|
| 6,266,570 B1 | 7/2001 | Hocherl et al. |
| 7,131,065 B1 | 10/2006 | Kane |
| 7,222,078 B2 | 5/2007 | Abelow |
| 7,512,622 B2 | 3/2009 | Volk et al. |
| 7,636,732 B1 | 12/2009 | Nielsen |
| RE42,683 E | 9/2011 | Marcus |
| 8,037,063 B2 | 10/2011 | Oldham et al. |
| 8,041,596 B2 | 10/2011 | Graham et al. |
| 8,200,775 B2 | 6/2012 | Moore |
| 8,306,976 B2 | 11/2012 | Handman et al. |
| 8,341,179 B2 | 12/2012 | Zeinfeld |
| 8,391,455 B2 | 3/2013 | Kelkar et al. |
| 8,417,581 B2 | 4/2013 | Ajjarapu et al. |
| 8,818,898 B2 | 8/2014 | Schlossberg et al. |
| 9,037,568 B1 | 5/2015 | Xian et al. |
| 9,326,032 B2 | 4/2016 | Molinelli et al. |
| 9,389,754 B2 | 7/2016 | Reese et al. |
| 9,626,438 B2 | 4/2017 | Magnaghi et al. |
| 9,691,428 B2 | 6/2017 | Maser et al. |
| 2002/0065802 A1 | 5/2002 | Uchiyama |
| 2002/0073019 A1 | 6/2002 | Deaton |
| 2003/0164844 A1 | 9/2003 | Kravitz et al. |
| 2004/0049499 A1 | 3/2004 | Nomoto et al. |
| 2004/0127335 A1 | 7/2004 | Watterson et al. |
| 2005/0065917 A1* | 3/2005 | Anick .............. G06F 17/30864 |
| 2005/0250458 A1 | 11/2005 | Graham et al. |
| 2006/0026152 A1 | 2/2006 | Zeng et al. |
| 2006/0129534 A1 | 6/2006 | Jones et al. |
| 2006/0155656 A1 | 7/2006 | Kreder, III et al. |
| 2006/0229161 A1 | 10/2006 | Demas |
| 2006/0265730 A1 | 11/2006 | Hays et al. |
| 2007/0005649 A1 | 1/2007 | Wang et al. |
| 2007/0027845 A1 | 2/2007 | Dettinger et al. |
| 2007/0061332 A1* | 3/2007 | Ramer .............. G06Q 30/0241 |
| 2007/0067268 A1 | 3/2007 | Dai et al. |
| 2007/0074617 A1 | 4/2007 | Vergo |
| 2007/0074619 A1 | 4/2007 | Vergo |
| 2007/0083506 A1 | 4/2007 | Liddell et al. |
| 2007/0239542 A1 | 10/2007 | Shapiro |
| 2007/0266342 A1 | 11/2007 | Chang et al. |
| 2008/0005276 A1 | 1/2008 | Frederick |
| 2008/0104542 A1 | 5/2008 | Cohen et al. |
| 2008/0141134 A1 | 6/2008 | Miyazaki et al. |
| 2008/0141135 A1 | 6/2008 | Mason et al. |
| 2008/0201251 A1 | 8/2008 | Magdon-Ismail et al. |
| 2009/0037421 A1 | 2/2009 | Gamble |
| 2009/0047644 A1 | 2/2009 | Mensah et al. |
| 2009/0048939 A1 | 2/2009 | Williams |
| 2009/0075782 A1 | 3/2009 | Joubert et al. |
| 2009/0077124 A1 | 3/2009 | Spivack et al. |
| 2009/0119268 A1 | 5/2009 | Bandaru et al. |
| 2009/0240732 A1 | 9/2009 | Amidon et al. |
| 2009/0248510 A1 | 10/2009 | Ahluwalia |
| 2009/0327223 A1 | 12/2009 | Chakrabarti et al. |
| 2010/0005068 A1 | 1/2010 | Howard et al. |
| 2010/0023863 A1 | 1/2010 | Cohen-Martin |
| 2010/0049709 A1 | 2/2010 | Ravikumar et al. |
| 2010/0070523 A1 | 3/2010 | Delgo et al. |
| 2010/0082657 A1 | 4/2010 | Paparizos et al. |
| 2010/0161354 A1 | 6/2010 | Lim et al. |
| 2010/0205228 A1 | 8/2010 | Reese |
| 2010/0211564 A1 | 8/2010 | Cohen et al. |
| 2010/0306656 A1 | 12/2010 | Moloney et al. |
| 2011/0093488 A1 | 4/2011 | Amacker et al. |
| 2011/0130852 A1 | 6/2011 | Thorn |
| 2011/0164042 A1 | 7/2011 | Chaudhri |
| 2011/0191684 A1 | 8/2011 | Greenberg |
| 2011/0225156 A1 | 9/2011 | Pavlik |
| 2011/0231762 A1 | 9/2011 | Toida |
| 2011/0258032 A1 | 10/2011 | Vadlamani et al. |
| 2011/0276372 A1 | 11/2011 | Spivack et al. |
| 2011/0281249 A1 | 11/2011 | Gammell et al. |
| 2011/0319229 A1 | 12/2011 | Corbalis et al. |
| 2011/0320444 A1 | 12/2011 | Yehaskel et al. |
| 2012/0040799 A1 | 2/2012 | Jaquish et al. |
| 2012/0041768 A1 | 2/2012 | Reese |
| 2012/0072435 A1 | 3/2012 | Han |
| 2012/0192253 A1 | 7/2012 | Betsch et al. |
| 2012/0221687 A1 | 8/2012 | Hunter et al. |
| 2012/0244995 A1 | 9/2012 | Dibenedetto et al. |
| 2012/0254755 A1 | 10/2012 | Wohlert |
| 2012/0272147 A1 | 10/2012 | Strober |
| 2012/0272185 A1 | 10/2012 | Dodson et al. |
| 2012/0322041 A1 | 12/2012 | Weisman |
| 2013/0007617 A1 | 1/2013 | Mackenzie et al. |
| 2013/0013764 A1 | 1/2013 | Li et al. |
| 2013/0031478 A1 | 1/2013 | Strober |
| 2013/0040271 A1 | 2/2013 | Rytky et al. |
| 2013/0055097 A1 | 2/2013 | Soroca et al. |
| 2013/0073534 A1 | 3/2013 | French |
| 2013/0073957 A1 | 3/2013 | DiGiantomasso et al. |
| 2013/0080460 A1 | 3/2013 | Tomko et al. |
| 2013/0095458 A1 | 4/2013 | Cha et al. |
| 2013/0160051 A1 | 6/2013 | Armstrong et al. |
| 2013/0191749 A1 | 7/2013 | Coburn, IV et al. |
| 2013/0244212 A1 | 9/2013 | Giuliani et al. |
| 2013/0263023 A1 | 10/2013 | Goodwin et al. |
| 2013/0316316 A1 | 11/2013 | Flavell et al. |
| 2014/0067477 A1 | 3/2014 | Zhao |
| 2014/0113768 A1 | 4/2014 | Lin et al. |
| 2014/0135955 A1 | 5/2014 | Burroughs |
| 2014/0157171 A1 | 6/2014 | Brust et al. |
| 2014/0272891 A1 | 9/2014 | Saladino et al. |
| 2014/0313341 A1 | 10/2014 | Stribling |
| 2014/0324850 A1 | 10/2014 | Magnaghi et al. |
| 2014/0344693 A1 | 11/2014 | Reese et al. |
| 2016/0246463 A1 | 8/2016 | Reese et al. |

FOREIGN PATENT DOCUMENTS

| | | |
|---|---|---|
| KR | 1020090034573 | 4/2009 |
| KR | 1020090100435 | 9/2009 |
| KR | 1020110043901 | 4/2011 |
| KR | 1020120115438 | 10/2012 |

OTHER PUBLICATIONS

An Adaptive Pricing Scheme for Content Delivery Systems Srinivasan Jagannathan et al.
Dec. 11, 2009, as printed on, "Digg—Wikipedia, the free encyclopedia".
Economy-based Content Replication for Peering Content Delivery Networks Al-Mukaddim Kahn Pathan et al.
International Patent Application Serial No. PCT/US2011/024875, International Search Report and Written Opinion, dated Sep. 30, 2011.
International Patent Application Serial No. PCT/US2011/042458, International Search Report and Written Opinion, dated Feb. 9, 2012.
International Patent Application Serial No. PCT/US2014/033684, International Search Report and Written Opinion, dated Oct. 2, 2014.
Users' Benefit and Provider's Revenue of Content Delivery Services with Priority Control Kyoko Yamori, Yoshiaki Tanaka, 2006, pp. 240-251, http://link.springer.com/chapter/10.1007%2F978-0-387-39229-5_20.
Moon, Ju-Hyoung et al. "An Object Model of Korean Web Pages for Title Identification", 15th Annual Conference on Human and Cognitive Language Technology, 2003, 5 pages.

(56) References Cited

OTHER PUBLICATIONS

International Patent Application Serial No. PCT/US2014/033466, International Preliminary Report on Patentability and Written Opinion, dated Aug. 18, 2014.
U.S. Appl. No. 13/869,758, filed Apr. 24, 2013, Antonio Magnaghi, et al., Notice of Allowance dated Dec. 7, 2016.

* cited by examiner

SYSTEMS AND METHODS FOR DETERMINING CONTENT POPULARITY BASED ON SEARCHES

CROSS-REFERENCE TO RELATED APPLICATIONS

The present application is a continuation application of U.S. patent application Ser. No. 13/869,758, filed Apr. 24, 2013 and entitled "SYSTEMS AND METHODS FOR DETERMINING CONTENT POPULARITY BASED ON SEARCHES", the entire disclosure of which application is hereby incorporated herein by reference.

This application is related to U.S. application Ser. No. 13/869,826, filed Apr. 24, 2013 and entitled "SYSTEMS AND METHODS FOR PREDICTING REVENUE FOR WEB-BASED CONTENT," the content of which is incorporated by reference in its entirety.

BACKGROUND

Increasingly, users of computing devices turn to Internet searches to find various forms of content related to a variety of topics, such as educational/instructional materials; music, movies, and other entertainment; consumer/product information; and others. Opportunities for authors, publishers, advertisers, and others to provide such content are likewise increasing.

Creation of such content can create various revenue generation opportunities. Service providers may, for example, derive direct revenue from selling such content to other website providers or directly to users, or via advertising revenues associated with websites providing such content to users for free.

In attempting to meet the increasing demand for digital web-based content, however, content providers may have difficulty gauging the popularity of the content they produce. Consumer surveys may be utilized, but these are often expensive, time-consuming, and prone to inaccuracies. Content production may likewise be time-consuming and/or expensive, and the production of an unpopular article, video, or other content is not likely to allow the content provider to recoup his or her investment in generating the content, much less turn a profit.

Embodiments of the present disclosure address these and other issues.

SUMMARY OF THE DESCRIPTION

Embodiments of the present disclosure help content providers identify popular topics based on Internet search data, as well as to quantify the popularity of content addressing those topics. Embodiments disclosed herein can operate quickly, inexpensively, and efficiently using real-time or near-real-time data, thereby delivering fast, timely information to content providers and allowing the providers to produce content to meet the specific demands of Internet users searching for such content.

A computer-implemented method according to one embodiment of the present disclosure comprises receiving search data by a computer system; identifying a category related to at least a portion of the search data; determining, by the computer system and based on the search data, a topic for content associated with the identified category; and determining, by the computer system, a score indicative of a level of popularity for the topic, wherein determining the score is based on the search data and on one or more formats for the content associated with the topic.

The present disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

A more complete understanding of certain embodiments may be derived by referring to the detailed description and claims when considered in connection with the following illustrative figures.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
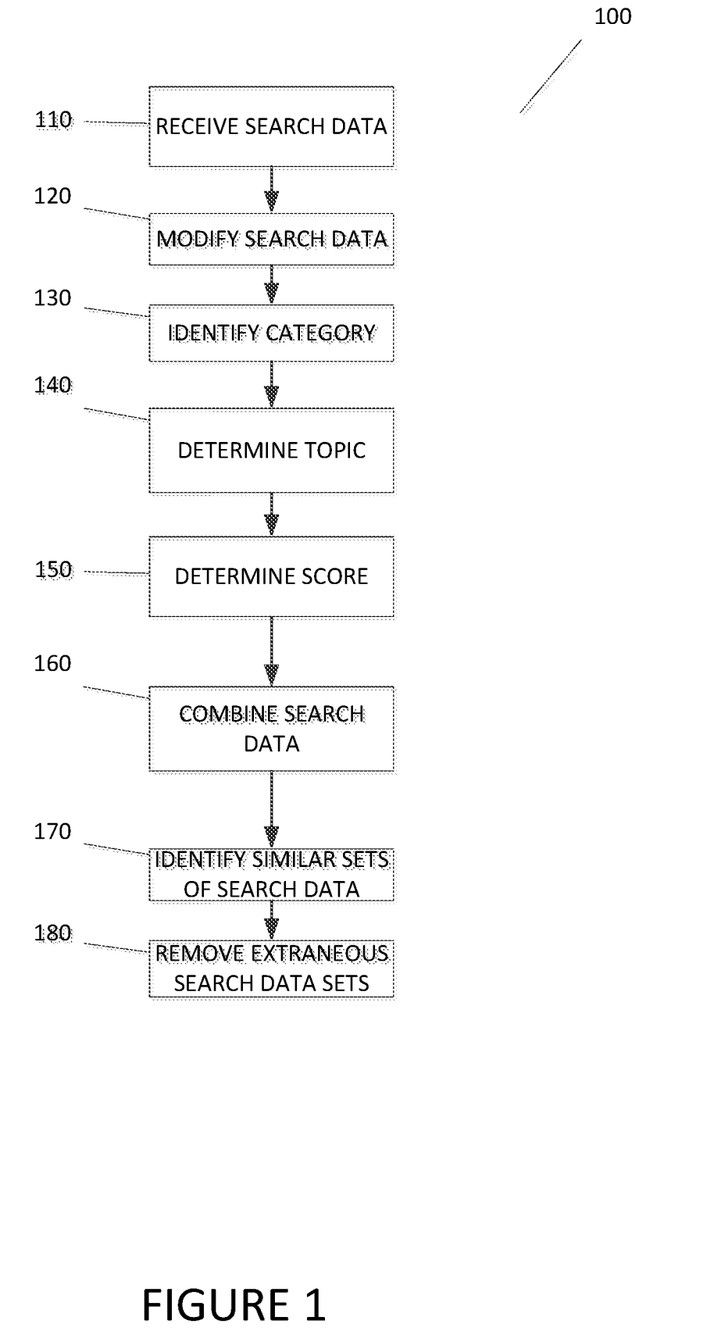
FIG. 1 is a flow diagram according to various embodiments.

FIG. 1 depicts an exemplary process according to various embodiments of the present disclosure. In FIG. 1, method 100 includes receiving search data (110); identifying a category related to at least a portion of the search data (120); determining, based on the search data, a topic for content associated with the identified category (130); determining, based on the search data, a score indicating the popularity of the topic (140); combining the search data with previously-received search data (150); identifying similar sets of search data (160); and removing extraneous search data sets (170). The steps of method 100 may be implemented (in whole or in part) by software operating on a computer system, such as the exemplary computer system 200 depicted in FIG. 2.

The search data may be received (110) from any source. For example, referring again to FIG. 2, the search data may be received by a computing device 210 (via network 240) from a web server (230) hosting a web site where search data is entered. The search data can also be received (directly or indirectly) from a user's computing device, such as device 220 in FIG. 2.

The search data may include any desired information regarding a search, including search terms entered by a user, information regarding a website hosting content accessed by a user, information regarding content returned in response to search terms entered by a user, information regarding content accessed by a user subsequent to a search, and combinations thereof. In various embodiments, for example, a set of search data may include search terms entered into a search engine by a user, the results returned by the search engine in response to the entered search terms (e.g., websites and links to content thereon), and the link(s) within the search results that the user selects/accesses. Other information that may be included in the search data includes the amount of time a user spends viewing various content and/or the portions or amount of content a user actually accesses. For example, the search data may indicate that a user watches 30 seconds of a 5 minute video, and more particularly the first 30 seconds of the video before navigating away. In another example, the search data may note that a user spent 5 minutes reading a 10-page article, with four of the five minutes spent on the eighth page. Among other things, embodiments of the present disclosure can analyze information on the user's interaction with search results to further help content providers focus on producing content that will be most likely to be accessed by various users.

The search data may be modified (120) in various ways by embodiments of the present disclosure. The search data may be modified at any desired point in a process implemented by an embodiment of the disclosure and any desired modification may be made. For example, where the search data includes search terms such as "video racing stok car," embodiments of the present disclosure may add, remove, rearrange, change, and correct the search terms such that the search terms constitute a well-formed sentence, such as "videos of stock car racing." Accordingly, modification of search data may include: adding a search term to the search data; removing a search term to the search data; correcting a search term in the search data; replacing a first search term in the search data with a synonymous search term; modifying punctuation within search terms in the search data; modifying capitalization of a search term in the search data; modifying the search data according to one or more editorial guidelines; and combinations thereof.

Some or all of a set of search data may be modified. In some cases, search data may be modified by removing portions of the search data. For example, search data may be removed in response to an associated topic having a score beyond a predetermined threshold (e.g., a score that fails to meet a minimum level of desired popularity). Search data may also be removed or redacted based on a list of prohibited or blacklisted content (e.g., profanity or adult material), as well as based on a set of editorial rules defined, for example, by the content provider. As described in more detail below, search data may be removed when it is sufficiently similar to other received search data to help reduce duplicate topics being presented to content providers.

The search data is analyzed to identify one or more related categories (130). Categories may be based on a set of target domains/websites, various similarities between the target sites (such as types or formats of content on the target sites), as well as any other desired criteria. Categories can be defined manually by a human, or automatically by, for example, web-crawling software scanning the content of various sites and assigning and/or identifying categories based on the scans. Embodiments of the present disclosure may group categories together, as well as well as define any number of subcategories in a hierarchy. For example, search data that includes the search terms "how to replace a FORD fuel pump" may result in the identification of an "automotive" category, with a first-level subcategory of "general repair," a second-level subcategory of "FORD vehicles," and a third-level subcategory of "fuel pumps."

A topic for content associated with the category is determined (140) based on the search data. In some cases, aspects of the intent of the user initiating a search may be determined based on information from the search data. For example, where a user enters search terms of "stock car racing" and where the search data indicates that the results of a search included content in both a video format and a textual format, but the user only accessed video content, embodiments of the present disclosure may infer that the user intended to find videos of stock car racing, even though the user did not specify videos in the search terms. In this manner, embodiments of the present disclosure can not only alert content providers to popular topics, but to the content formats most likely to draw attention from users.

In one exemplary embodiment, identification of a category is performed by processing the search data using a statistical language model to determine probabilities that various search terms within the search data are associated with one or more categories. In one exemplary embodiment, the IRST Language Modeling Toolkit from Foundazione Bruno Kessler is utilized (http://hlt.fbk.eu/en/irstlm).

In the exemplary method 100 depicted in FIG. 1, a score indicative of the popularity of the identified topic is determined (150). The score may be of any desired format. In one exemplary embodiment, the score is a numeric value whereby a higher value is indicative of a higher level of popularity and a lower value is indicative of a lower level of popularity.

The score may be based on a variety of different factors and criteria. For example, the score may be based on information regarding a web site from which the search data is received. Such information may include the number of visits the website receives in a period of time, the frequency that content on (or via) the web site is accessed within a period of time, the different formats of content offered on (or via) the website and metrics regarding the frequency the different formats are accessed by users, and other information.

The score may be influenced by information from other sources as well. In an exemplary embodiment of the present disclosure, a database is maintained whereby user interaction with various forms of content (such as searches directed to the content and selection/access of the content) is cataloged and retrieved. Among other things, such statistical data can help content providers identify the format (e.g., video vs. text) for content they intend to produce for a given topic. Various content formats may include, for example, audio, video, text, images, and combinations thereof. A format may be determined based on user interaction with search results (as described above) as well as from one or more search terms in the search data (e.g., the inclusion of the term "video" in the search terms indicating the user wishes to access a video).

The score can be determined for any number of different sets of search data, and a set of search data may have multiple scores associated with it. In some embodiments, a first score for content for a topic in a first format (e.g., text) is determined, and a second score for content for the same topic in a second format (e.g., video) is determined. In this manner, a comparison between content formats for the same topic can be presented to a content provider to help the provider determine the optimal format to use.

In the exemplary method 100 depicted in FIG. 1, recently-received search data may be combined with previously-received search data (160). By maintaining this search data (e.g., in a database) embodiments of the present disclosure can provide content providers with a real-time or near-real-time summary of different topics being searched for by users, and their respective popularity. Additionally, search data can be combined with other search data for statistical analysis and other purposes.

In method 100, the combined search data (i.e., the recently-received data and the previously-received data) is analyzed to identify sets of search data or topics that are similar to each other (170). For example, a topic or search terms of "how to wash my car" may be identified as similar to a topic or search terms of "how to wash my automobile." In one exemplary embodiment, a topic or search terms are parsed and analyzed using a part-of-speech tagger to identify nouns, verbs, adjectives, and other parts of the search terms. An exemplary part-of-speech tagger that may be used in conjunction with embodiments of the present disclosure is described at http://nlp.stanford.edu/software/tagger.shtml, the contents of which are incorporated herein by reference. Additionally, topics or search terms can be further processed, via software, to identify the stems (i.e. root words without morphological affixes) of search terms, filter "stop words" (i.e., common words that are not utilized by a search engine), handle phrasal nouns, and other processing. An additional exemplary software package that may be used in conjunction with embodiments of the present disclosure to perform various processing of the search terms is the "Natural Language Toolkit" described at http://nltk.org, the contents of which are incorporated herein by reference.

Topics or search terms within the search data may also be processed to identify synonyms of words within the topic or search terms and to generate a score indicative of a level of similarity between the topics or search terms. In various embodiments, semantic ontologies (such as the WordNet lexical database described at http://wordnet.princeton.edu/, the contents of which are incorporated herein by reference) may be utilized to identify similarities between topics or search terms. In an exemplary embodiment utilizing the WordNet database, topics may be grouped into sets synonyms and values reflecting semantic and lexical similarities between two topics calculated. Table 1 (below) illustrates an exemplary comparison between two topics, and their associated groups of synonyms ("Synsets") and values reflecting the level of lexical or semantic similarities between the topics ("Sim Values"). In this example, the Sim Values are calculated based on the cosine distance between the feature vector representations of the titles.

TABLE 1

| | Topic 1<br>How to Make a Steely<br>Pan Drum Out of<br>Coffee<br>Cans | Topic 2<br>How to Make a Steel<br>Pan Drum Out of<br>Coffee Cans | Sim Value |
|---|---|---|---|
| Features<br>(Lex) | pan coffee drum can steely | pan steel coffee drum can | 0.66666 |
| Features<br>(Sem) | make pan coffee drum can a out steely<br>Synset('pan.n.01')<br>Synset('coffee.n.01')<br>Synset('can.n.01')<br>Synset('drum.v.01') to how of | make pan steel coffee drum can a out<br>Synset('pan.n.01')<br>Synset('steel.n.01')<br>Synset('coffee.n.01')<br>Synset('can.n.01')<br>Synset('drum.v.01') to how of | 0.87894 |

Given multiple sets of search data that are determined to be similar, embodiments of the present disclosure may remove sets of search data determined to be extraneous (180). In this context, an "extraneous" search data set may include search data that is similar to search data already in the database, that is associated with a topic that has a lower associated popularity (or score) than search data associated with another topic, as well as any other desired criteria.

Figure 2:
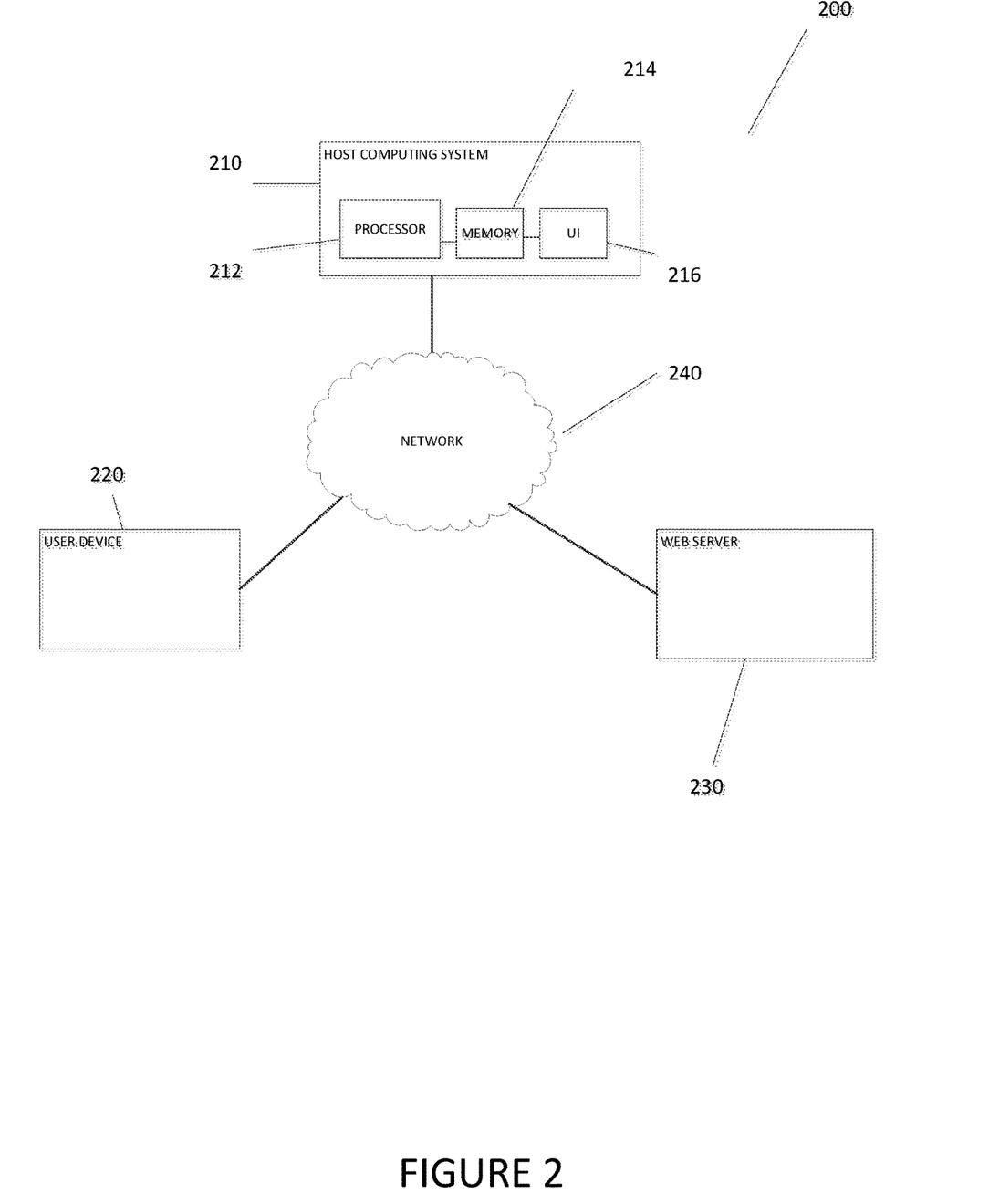
FIG. 2 shows a block diagram of an exemplary system according to various embodiments.

FIG. 2 shows a block diagram of system which may be used in conjunction with various embodiments. While FIG. 2 illustrates various components of a computer system, it is not intended to represent any particular architecture or manner of interconnecting the components. Other systems that have fewer or more components may also be used.

In FIG. 2, the system 200 includes a host computer system 210 comprising a processor 212, memory 214, and user interface 216. Host computer system 210 may include any number of different processors, memory components, and user interface components, and may interact with any other desired systems and devices in conjunction with embodiments of the present disclosure.

The functionality of the host system 210, including the method depicted in FIG. 1, (in whole or in part), may be implemented through the processor 212 executing computer-readable instructions stored in the memory 214 of the system 210. The memory 214 may store any computer-readable instructions and data, including software applications, applets, and embedded operating code.

The functionality of the host system 210 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 212 retrieves and executes instructions stored in the memory 214 to control the operation of the system 210. Any type of processor, such as an integrated circuit microprocessor, microcontroller, and/or digital signal processor (DSP), can be used in conjunction with embodiments of the present disclosure. A memory 214 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 214 in any desired manner.

The host system 210 includes a user interface 216 may include any number of input devices (not shown) to receive commands, data, and other suitable input from a user, as well as any number of output devices (not shown) to provides the user with data, notifications, and other suitable information. Typical I/O devices may include mice, keyboards, modems, network interfaces, printers, scanners, video cameras and other devices.

The host system 210 may communicate with one or more user devices 220, one or more web servers 230, and other systems and devices in any desired manner, including via network 240. The user device 220 may include any computing device from which a user enters search terms, interacts with one or more search results (e.g., content hosted on web server 230) or performs any other function in conjunction with systems and methods of the present disclosure. The web server may host one or more web pages that provide search results to the user's device 220, hosts content accessible by the user, collects metrics and information regarding the user's interaction with various content, or performs other functionality in accordance with the embodiments of the present disclosure.

The user device 220 and web server 230 may include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 240 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present invention. These and other changes or modifications are intended to be included within the scope of the present disclosure, as expressed in the following claims.

What is claimed is:
1. A computer-implemented method comprising:
 receiving search data, by a computer system, from a server of a content provider providing content to a website, the search data including first information indicative of a first content format accessed by a user from search results, the search data further including second information indicative of a second content format accessed less than the first content by users;

combining the search data with previously-received search data;

identifying similar sets of search data within the combined search data;

removing a first set of search data that is similar to a second set of search data,
- wherein the first set of search data is removed in response to a first topic associated with the first set of search data having a lower associated popularity than a second topic associated with the second set of search data based on respective scores for the first topic and the second topic, and
- wherein identifying similar sets of search data includes:
  - identifying synonyms for one or more respective search terms in the first set of search data and the second set of search data; and
  - generating a score indicative of a level of similarity between the first set of search data and the second set of search data;

determining, by the computer system, a score indicative of a level of preference for the first content format and one or more topics associated with first content format, wherein determining the score is based on the search data; and communicating the one or more topics and the score to the content provider so that the content provider can use the one or more topics and the score to determine preferred content and content format of users.

2. The method of claim 1, further comprising modifying the search data.

3. The method of claim 2, wherein modifying the search data includes one or more of:
- adding a search term to the search data;
- removing a search term to the search data;
- correcting a search term in the search data;
- replacing a first search term in the search data with a synonymous search term;
- modifying punctuation within search terms in the search data;
- modifying capitalization of a search term in the search data;
- modifying the search data according to one or more editorial guidelines; and
- combinations thereof.

4. The method of claim 1, wherein determining the score is based on information regarding a website from which the search data is received.

5. The method of claim 1, further comprising removing at least a portion of the search data.

6. The method of claim 5, wherein removing the search data includes removing search data having a score beyond a predetermined threshold.

7. The method of claim 5, wherein removing the search data includes removing search data based on a list of blacklisted content.

8. The method of claim 5, wherein removing the search data includes removing search data based on a set of editorial rules.

9. The method of claim 1, wherein the search data includes one or more of:
- search terms entered by a user;
- information regarding a website hosting content accessed by a user;
- information regarding content returned in response to search terms entered by a user;
- information regarding content accessed by a user subsequent to a search; and
- combinations thereof.

10. The method of claim 1, wherein the score for the topic is further determined based on a content format.

11. The method of claim 10, wherein the content format includes one or more of: audio; video; text; an image; and combinations thereof.

12. The method of claim 10, further comprising:
- determining a first score for content for the topic having a first format; and
- determining a second score for content for the topic having a second format.

13. The method of claim 10, wherein the content format is determined based on a determination that one or more search terms in the search data is indicative of the content format.

14. A non-transitory, computer-readable medium storing instructions that, when executed, cause a computing device to:

receive search data from a server of a content provider providing content to a web site, the search data including first information indicative of a first content format accessed by a user from search results, the search data further including second information indicative of a second content format accessed less than the first content by users;

combine the search data with previously-received search data;

identify similar sets of search data within the combined search data;

remove a first set of search data that is similar to a second set of search data,
- wherein the first set of search data is removed in response to a first topic associated with the first set of search data having a lower associated popularity than a second topic associated with the second set of search data based on respective scores for the first topic and the second topic, and
- wherein identifying similar sets of search data includes:
  - identifying synonyms for one or more respective search terms in the first set of search data and the second set of search data; and
  - generating a score indicative of a level of similarity between the first set of search data and the second set of search data;

determine a score indicative of a level of preference for the first content format and one or more topics associated with first content format, wherein determining the score is based on the search data; and communicate the one or more topics and the score to the content provider so that the content provider can use the one or more topics and the score to determine preferred content and content format of users.

15. A system comprising:

at least one processor; and memory in communication with the at least one processor and storing instructions that, when executed by the processor, cause the system to:

receive search data from a server of a content provider providing content to a website, the search data including first information indicative of a first content format accessed by a user from search results, the search data further including second information indicative of a second content format accessed less than the first content by users;

combine the search data with previously-received search data;

identify similar sets of search data within the combined search data;

remove a first set of search data that is similar to a second set of search data,
  wherein the first set of search data is removed in response to a first topic associated with the first set of search data having a lower associated popularity than a second topic associated with the second set of search data based on respective scores for the first topic and the second topic, and
  wherein identifying similar sets of search data includes:
    identifying synonyms for one or more respective search terms in the first set of search data and the second set of search data; and
    generating a score indicative of a level of similarity between the first set of search data and the second set of search data;

determine a score indicative of a level of preference for the first content format and one or more topics associated with first content format, wherein determining the score is based on the search data; and communicate the one or more topics and the score to the content provider so that the content provider can use the one or more topics and the score to determine preferred content and content format of users.

16. The system of claim 15, wherein the instructions, when executed by the processor, further cause the system to modify the search data.

17. The system of claim 15, wherein the determination of the score is based on information regarding a website from which the search data is received.

18. The system of claim 15, wherein the instructions, when executed by the processor, further cause the system to remove at least a portion of the search data.

19. The system of claim 15, wherein the search data includes one or more of:
  search terms entered by a user;
  information regarding a website hosting content accessed by a user;
  information regarding content returned in response to search terms entered by a user;
  information regarding content accessed by a user subsequent to a search; and
  combinations thereof.

20. The system of claim 15, wherein the score for the topic is further determined based on a content format.

* * * * *